Aug. 11, 1959  D. B. ERWIN  2,899,645
CONTROL SYSTEMS
Filed Sept. 8, 1955  2 Sheets-Sheet 2
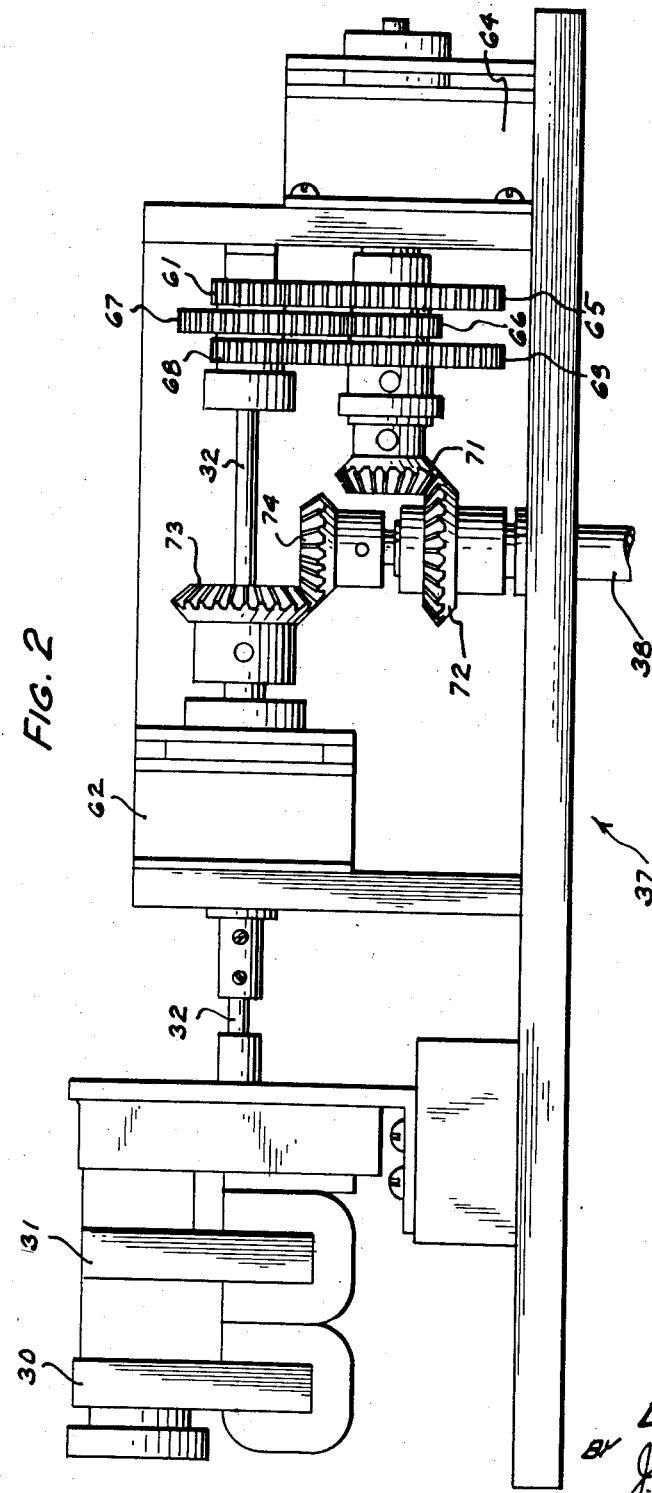
INVENTOR
D. B. ERWIN
BY J.R. Hall
ATTORNEY United States Patent Office 2,899,645
Patented Aug. 11, 1959

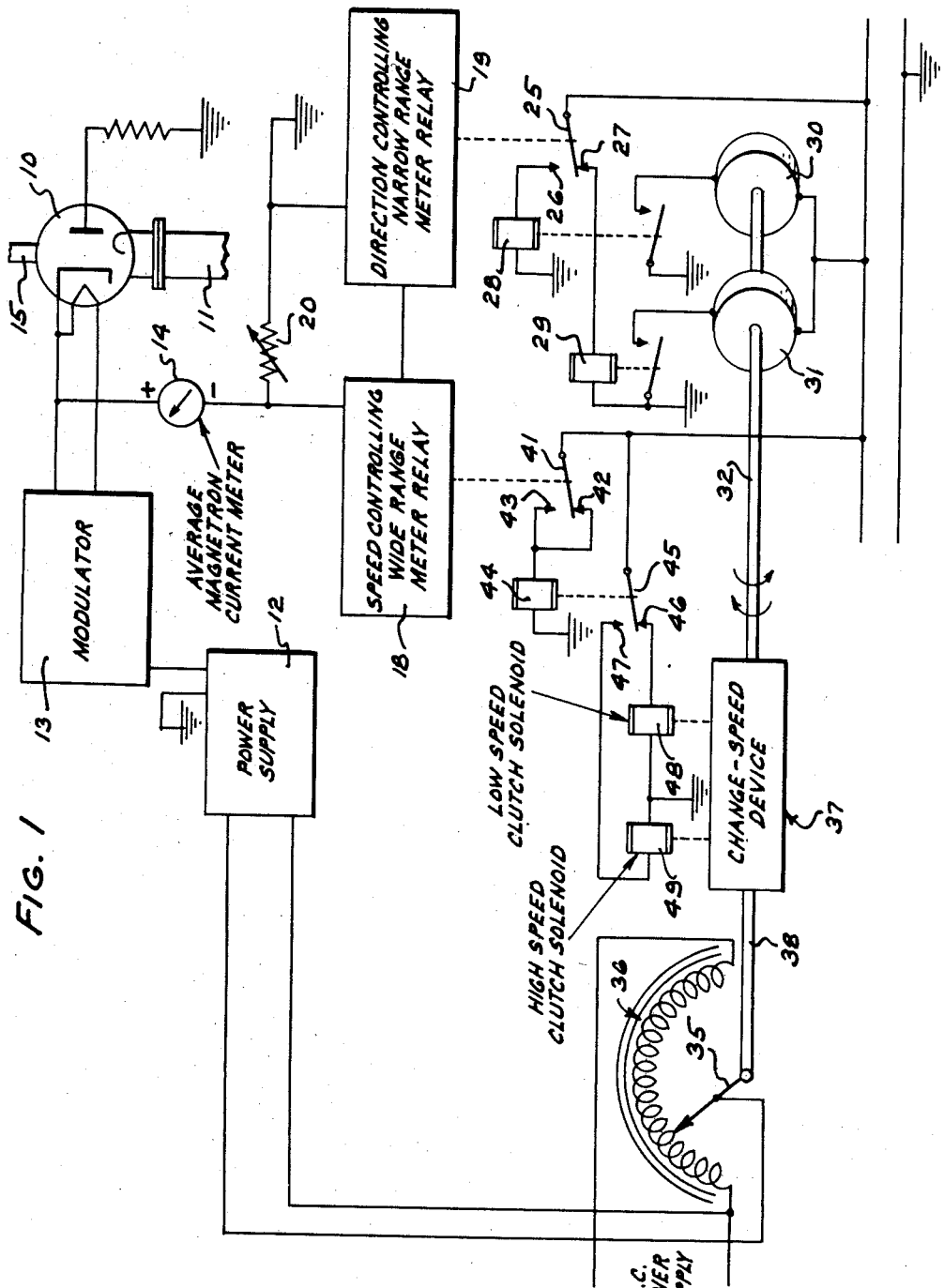

2,899,645

CONTROL SYSTEMS

David B. Erwin, La Grange, Ill., assignor to Western Electric Company, Incorporated, New York, N.Y., a corporation of New York Application September 8, 1955, Serial No. 533,121

12 Claims. (Cl. 331—86)

This invention relates to control systems, and more particularly to control systems for magnetron test sets.

In the use of control apparatus where settings of such apparatus must vary widely in a short period of time, it is desirable to automatically bring the apparatus to precise settings and to effect this as quickly as possible. If low speed setting mechanisms are used, excessive time is often required to change the setting, while if high speed setting mechanisms are used, it is difficult to obtain precision and hunting often occurs.

An object of the invention is to provide new and improved control systems.

Another object of the invention is to provide new and improved control systems for magnetron test sets.

Another object of the invention is to provide control systems having automatically operable setting mechanisms which change the system at high rate of speed toward a desired setting when the setting is outside a predetermined range and change the system at a low rate of speed when the setting is almost correct.

A control system illustrating certain features of the invention may include a reversible drive for a control device, and direction controlling means for actuating the drive. There also may be provided high speed means and low speed means for connecting the drive to the control device and means for changing from the high speed means to the low speed means as the control device nears an intended condition.

An apparatus illustrating the invention more specifically may include a meter relay operable when anode current of a magnetron being tested is outside a predetermined range for setting to high rate of speed a change-speed transmission driving power to a current-adjusting device and setting the transmission to low rate of speed when the anode current is in said range. A second meter relay serves to actuate a reversible motor to drive the transmission in a direction such as to drive the current-adjusting device toward a predetermined point tending to cause the magnetron to have an anode current of a predetermined value within said range.

A complete understanding of the invention may be obtained from the following detailed description of a control system forming a specific embodiment thereof, when read in conjunction with the appended drawings, in which Fig. 1 is a schematic of a control system forming one embodiment of the invention, and Fig. 2 is a front elevational view of a change-speed device forming a portion of the system shown in Fig. 1.

Referring now in detail to the drawings, there is shown therein a control apparatus for a test set for energizing a magnetron 10 so as to keep the average anode current thereof constant. The magnetron's output goes to a load 11, and, as a magnetron-frequency adjusting mechanism 15 is changed, either automatically or manually, the average current of the magnetron varies, and a power supply 12 of a well known type must be adjusted according to the change in the current to supply power to a modulator 13 of a well known type to supply more or less power to the magnetron 10. A meter 14 receives current from the magnetron proportional to the anode current, and this current flows to ground through series-connected windings of high-sensitivity meter relays 18 and 19 of a well known type, and a manually adjustable range-controlling rheostat 20 shunting the relays. The rheostat 20 controls the range of voltage across the relays 18 and 19, and thus, may be adjusted slowly to bring the power applied to the magnetron up slowly in the start of a test.

If the average anode current is within a very narrow desired range, the relay 19 holds a contactor 25 in a position out of contact with both contacts 26 and 27 so that neither relay 28 nor relay 29 is energized and motors 30 and 31 for driving a shaft 32 in opposite directions are both deenergized. If the average magnetron anode current is below this narrow range, the meter relay 19 holds the contactor 25 against the contact 27 to energize the relay 29 to energize the motor 31, which drives the shaft 32 in such a direction as to drive a contactor 35 of a variac 36, through a change-speed device 37 and a shaft 38, in a direction raising the voltage output of the power supply 12 to raise the anode current. If the average magnetron anode current is above this narrow range, the meter relay 19 holds the contactor 25 in engagement with the contact 26 to energize the relay 28 to energize the motor 30 to drive the shaft 32 in the opposite direction to adjust the power supply 12 to lower its voltage output. If the magnetron anode current is within the narrow desired range, the relay 19 holds the contactor out of engagement with both contacts 26 and 27 to keep both motors 30 and 31 deenergized.

If the average magnetron anode current is outside a broader predetermined range having the previously described narrow desired range in the center thereof, the meter relay 18 either holds a contactor 41 in engagement with a contact 42 if the current is on the low side of the broader range, or holds the contactor 41 in engagement with a contact 43 if the current is on the high side of the broader range. In both of these conditions, a relay 44 is energized to move a contactor 45 from a contact 46 to a contact 47 to deenergize a low speed clutch solenoid 48 and energize a high speed clutch solenoid 49. Whenever the solenoid 49 is energized the change-speed device 37 drives the shaft 38 at the same rate of speed as that of the shaft 32 so that the variac 36 and the power supply 12 are adjusted rapidly. Whenever the average magnetron anode current is within the broader range, which means that it is too close to the desired value for high speed adjustment of the power supply 12, the relay 18 holds the contactor 41 away from both contacts 42 and 43 so that only the clutch solenoid 48 is energized, and the clutch solenoid 48 places the change speed device 37 in a condition reducing the ratio of the speed of the shaft 32 to that of the shaft 38 from 1:1 to 40:1. Then the variac 36 and the power supply 12 are brought closely to desired adjustment. Hence, no overshooting of or hunting for desired adjustment occurs.

The change-speed device 37 includes the input shaft 32 driving positively a gear 61 keyed thereto and a driver of a clutch 62 of a well known type. For slow speed of the output shaft 38, a clutch 64 of a well known type is made operative by energization of the solenoid 48, and a gear 65 keyed to a gear 66 drives a gear 67 keyed to a gear 68 to drive a gear 69. The gear 69 drives the driver of the clutch 64, which drives a gear 71 to drive a gear 72 keyed to shaft 38. At this time the clutch 62 permits an output gear 73 thereof to run freely. The gears 67 and 68 rotate freely on the shaft 32, and the gears 65 and 66 rotate freely relative to the gear 69. For high speed output to rapidly adjust the variac 36, the clutch 64 is thrown out, and the clutch 62 is made operative and drives the shaft directly through gears 73 and 74.

It is to be understood that the above-described arrangements are simply illustrative of the application of the principles of the invention. Numerous other arrangements may be readily devised by those skilled in the art, which will embody the principles of the invention and fall within the spirit and scope thereof.

What is claimed is:

1. A control system, which comprises a device, means for measuring a characteristic of the device having a predetermined desired value, normally unoperated means for adjusting the device to vary the value of the characteristic, means operated by the measuring means for driving the adjusting means at a high rate of speed when the value of the characteristic differs from the desired value by more than a predetermined amount, and means operated by the measuring means for driving the adjusting means at a slow rate of speed when the value of the characteristic differs from the desired value by less than said predetermined amount.

2. In a system for controlling a device, means for measuring a characteristic of the device, normally unoperated means for adjusting the device to vary the value of the characteristic, means operated by the measuring means for driving the adjusting means at a high rate of speed when the value of the characteristic differs from a predetermined value by more than a predetermined amount, and means operated by the measuring means for driving the adjusting means at a slow rate of speed when the value of the characteristic differs from said value by less than said predetermined amount.

3. In a control system for a device, means for supplying power to the device, normally unoperated means for varying the power-supplying means, means responsive to one condition of the device for initiating operation and driving the varying means at a high rate of speed, and means responsive to a second condition of the device for initiating operation and driving the varying means at a slow rate of speed.

4. In a control system for controlling a device, a device desired to be operated so as to provide a characteristic of a predetermined value, means for measuring the characteristic of the device, normally unoperated means reversible in response to the measuring means for adjusting the device to vary the value of the characteristic, means for initiating and driving the adjusting means at a high rate of speed when the value of the characteristic differs from the desired value by more than a predetermined amount, and means for initiating and driving the adjusting means at a slow rate of speed when the value of the characteristic differs from the desired value by less than said predetermined amount.

5. In a system for regulating a device, an adjustable power supply for energizing the device, a reversible drive for adjusting the power supply, means for measuring a characteristic of the device, direction-controlling means responsive to the measuring means for actuating the drive to adjust the power supply to bring the characteristic toward a predetermined value, means responsive to the measuring means for actuating the drive at a high rate of speed when the value of the characteristic differs by at least a predetermined amount from said predetermined value, and means responsive to the measuring means for actuating the drive at a low rate of speed when the value of the characteristic differs from said predetermined value by less than said amount.

6. In a system for controlling a device, a power supply for energizing the device, a variac for regulating power supplied to the device, a reversible drive for adjusting the variac, means for measuring a characteristic of the device, means responsive to the measuring means for actuating the drive to adjust the variac to bring the characteristic toward a predetermined value, means responsive to the measuring means for actuating the drive at a high rate of speed when the value of the characteristic differs by at least a predetermined amount from said predetermined value, and means responsive to the measuring means for actuating the drive at a low rate of speed when the value of the characteristic differs from said predetermined value by less than said amount.

7. In a magnetron test set, an adjustable power supply for energizing a magnetron, a reversible drive for adjusting the power supply, means for measuring a characteristic of the magnetron, direction-controlling means responsive to the measuring means for actuating the drive to adjust the power supply to bring the characteristic toward a predetermined value, means responsive to the measuring means for actuating the drive at a high rate of speed when the value of the characteristic differs by at least a predetermined amount from said predetermined value, and means responsive to the measuring means for actuating the drive at a low rate of speed when the value of the characteristic differs from said predetermined value by less than said amount.

8. A magnetron test set, which comprises an adjustable power supply for a magnetron, means for varying the load on the magnetron, a first meter relay operable when the magnetron anode current differs by more than a predetermined amount from a predetermined value, a second meter relay operable when the magnetron anode current is not at said value, a transmission having a high speed condition and a low speed condition for adjusting the power supply, a first solenoid for actuating the transmission to its high speed condition, a second solenoid for actuating the transmission to its low speed condition, a first motor for driving the transmission in a direction such as to increase the power output of the power supply, a second motor for driving the transmission in the opposite direction to decrease the power output of the power supply, means operable by the first meter relay for actuating the first solenoid when the magnetron anode current differs from said predetermined value by more than said predetermined amount, means operable by the first meter relay for actuating the second solenoid when the magnetron anode current differs from said predetermined value by less than said predetermined amount, means operable by the second meter relay for actuating the first motor when the magnetron anode current is less than said predetermined value, and means operable by the second meter relay for actuating the second motor when the anode current is greater than said predetermined value.

9. A magnetron test set, which comprises a power supply including an adjustable transformer for supplying power to a magnetron, means for varying the load on the magnetron, a meter for measuring the anode current of the magnetron, a first meter relay operable when the magnetron anode current differs by more than a predetermined amount from a predetermined value, a second meter relay operable when the magnetron anode current is not at said value, means connecting the meter relays in series with the meter, a rheostat connected in series with the meter and in parallel with the relays, a transmission having a high speed condition and a low speed condition for adjusting the transformer, a first solenoid for actuating the transmission to its high speed condition, a second solenoid for actuating the transmission to its low speed condition, a first motor for driving the transmission in a direction such as to increase the power output of the power supply, a second motor for driving the transmission in the opposite direction to decrease the power output of the power supply, means operable by the first meter relay for actuating the first solenoid when the magnetron anode current differs from said value by more than said predetermined amount, means operable by the first meter relay for actuating the second solenoid when the magnetron anode current differs from said value by no more than said predetermined amount, means operable by the second meter relay for actuating the first motor when the magnetron anode current is less than said predetermined value, and means operable by the second meter relay for actuating the second motor when the anode current is greater than said predetermined value.

10. In a control system for an electronic device, a source of power, an adjustable means for regulating and supplying said power to the electronic device, a first normally unoperated means for adjusting said regulating means, a second normally unoperated means for adjusting said regulating means, means responsive to current flow through said electronic device of a first predetermined range of magnitudes for operating the first means to adjust said regulating means, and means responsive to current flow through said electronic device beyond said predetermined range of magnitudes for operating said second means to adjust said regulating means.

11. In a control system for an electronic device, a power source for supplying current to said electronic device, means for varying the current supplied to the device, a first normally unoperated means for operating the varying means to increase the supplied current at a first predetermined rate, a second normally unoperated means for operating the varying means to decrease the supplied current at said first predetermined rate, means for measuring the current supplied to electronic device, a first relay circuit operated by the measuring means ascertaining current below a preselected range for operating said first normally unoperated means, a second relay circuit operated by the measuring means ascertaining current above the preselected range for operating said second normally unoperated means, and means responsive to the measuring means ascertaining current beyond a second preselected range for operating said current varying means at a second predetermined rate.

12. In a control system for an electronic device, a power source for supplying current to said electronic device, a resistor having a movable contact arm for controlling the current supplied to the electronic device, normally unoperated drive means for moving the contact arm to vary the current supplied to the electronic device, a first relay circuit including a normally open contact for operating said drive means, means responsive to a current beyond a first predetermined range for energizing said first relay circuit, means interposed between the drive means and the contact for changing the rate of movement of the contact arm by said drive means, a normally unoperated solenoid for operating said rate changing means, a second relay circuit having a normally open contact for operating said solenoid, and means responsive to a current beyond a second predetermined range for energizing said second relay circuit.

References Cited in the file of this patent

UNITED STATES PATENTS

| | | |
|---|---|---|
| 2,499,967 | Nicholson | Mar. 7, 1950 |
| 2,692,946 | Schroeder | Oct. 26, 1954 |
| 2,745,016 | Kulikowski et al. | May 8, 1956 |

FOREIGN PATENTS

| | | |
|---|---|---|
| 500,111 | Great Britain | Feb. 1, 1939 |